(12) United States Patent
Bekaert et al.

(10) Patent No.: US 8,811,679 B2
(45) Date of Patent: Aug. 19, 2014

(54) DIGITAL MAP EDITING PROCESS USING ACTIVE CONTOUR MANIPULATION

(75) Inventors: Tim Bekaert, Heule (BE); Pascal Clarysse, Koksijde (BE)

(73) Assignee: TomTom Belgium N.V., Gent (BE)

( * ) Notice: Subject to any disclaimer, the term of this patent is extended or adjusted under 35 U.S.C. 154(b) by 340 days.

(21) Appl. No.: 13/392,527

(22) PCT Filed: Dec. 31, 2009

(86) PCT No.: PCT/EP2009/068051
§ 371 (c)(1),
(2), (4) Date: May 18, 2012

(87) PCT Pub. No.: WO2011/023243
PCT Pub. Date: Mar. 3, 2011

(65) Prior Publication Data
US 2012/0237088 A1  Sep. 20, 2012

Related U.S. Application Data

(60) Provisional application No. 61/272,164, filed on Aug. 25, 2009.

(51) Int. Cl.
*G06K 9/00* (2006.01)
*G09G 5/00* (2006.01)
*G06Q 50/00* (2012.01)

(52) U.S. Cl.
USPC .......................... 382/113; 345/619; 705/313

(58) Field of Classification Search
CPC ............... G06K 1/00; G06K 9/00; G01C 1/00
See application file for complete search history.

(56) References Cited

U.S. PATENT DOCUMENTS 5,862,245 A * 1/1999 Renouard et al. ............. 382/113

OTHER PUBLICATIONS

International Search Report issued Sep. 3, 2010 for International Application No. PCT/EP2009/068051.

* cited by examiner

*Primary Examiner* — Abolfazl Tabatabai (57) ABSTRACT

A method for realigning network elements in a digital map based on a new data set using active contour manipulation techniques. The active contour optimization process is controlled so that certain desirable features in the original shape of the active contour(s) are not distorted. In the case of network features which may be represented by two or more open active contours, the active contours are coupled prior to optimizing so that the original desirable shape, e.g., the parallel spacing of lanes in a dual carriageway road, may be maintained during the optimization process. In the case of certain closed active contours, for example roundabout geometries, a single closed active contour may be coupled to itself by linking its control points one-to-another and maintaining a proportional direction and distance movement during the optimizing process. As a result, data base networks can be assessed and aligned with less difficulty and geometric distortion.

14 Claims, 7 Drawing Sheets

DIGITAL MAP EDITING PROCESS USING ACTIVE CONTOUR MANIPULATION

CROSS-REFERENCE TO RELATED APPLICATIONS

This application is the National Stage of International Application No. PCT/EP2009/068051, filed 31 Dec. 2009 and designating the United States. The entire contents of this application is incorporated herein by reference. The present application hereby claims priority under 35 U.S.C. §119(e) from U.S. Provisional Patent Application No. 61/272,164 filed 25 Aug. 2009, entitled "Method and system for a dynamic location referencing", the entire contents of which is hereby incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates generally to a method for editing digital maps using active contour techniques, and more particularly toward methods for preventing active contour misalignment during manipulation in situations where two closely spaced active contours represent portions of a shaped, real world object.

2. Related Art

It is known in some applications to use knowledge-driven active contours in connection with digital map creation and refinement. Active contours are used extensively for image and video segmentation as well as for tracking. They can be formulated in the framework of variational methods. The basic principle is to construct a partial differential equation (PDE) from an energy criterion, including usually both region and boundary functionals, by computing some variation of Euler-Lagrange equation. The PDE changes the shape of the current curve according to some velocity field which can be thought of as a descent direction of the energy criterion. So-called "closed" curve active contours are those which enclose an initial region, whereas "open" curves are more frequently associated with roads, lanes, and other features found often in digital maps. Through an optimization process, active curves (either closed or open) are driven toward the edges of an image through the minimization of a boundary integral of features depending on edges.

For example, U.S. Pat. No. 5,862,245 in the name of Renouard, et al., issued Jan. 19, 1999, discloses a method of extracting a contour in a digital map image using, in part, an active contour manipulation approach. Contour extraction is based on an iterative process of deforming an active contour (open in this case) using an energy minimizing function. These and other prior art methods rely on the input of an initial contour, i.e., a so-called seed contour, into the digital map near the contour to be extracted. This initial contour may be in the form of a polygonal trace which can be as simple as a line or curvilinear mark. The iterative process deforms the initial contour until it finds an equilibrium position corresponding to an energy minimum, the equilibrium position defining a part of the trace of the contour to be extracted.

In connection with digital map editing activities, the initial or seed contour(s) may be obtained or derived from probe data, or from a possibly spatially inaccurate existing digital map. Probe data inputs are obtained from low-cost positioning systems and handheld devices and mobile phones with integrated GPS functionality for the purpose of incrementally creating and/or updating digital maps. The input to be processed from such probe data consists of recorded GPS traces in the form of a standard ASCII stream, which is supported by most existing GPS devices. The output may be a trace line in the form of a directed graph with nodes and edges or links associated with travel time information. The probe data, which creates the nodes or probe positions at regular intervals, can be transmitted to a collection service or other map making or data analysis service via wireless (e.g., cellular) transmission, Internet uploads, or by other means.

Figure 1:
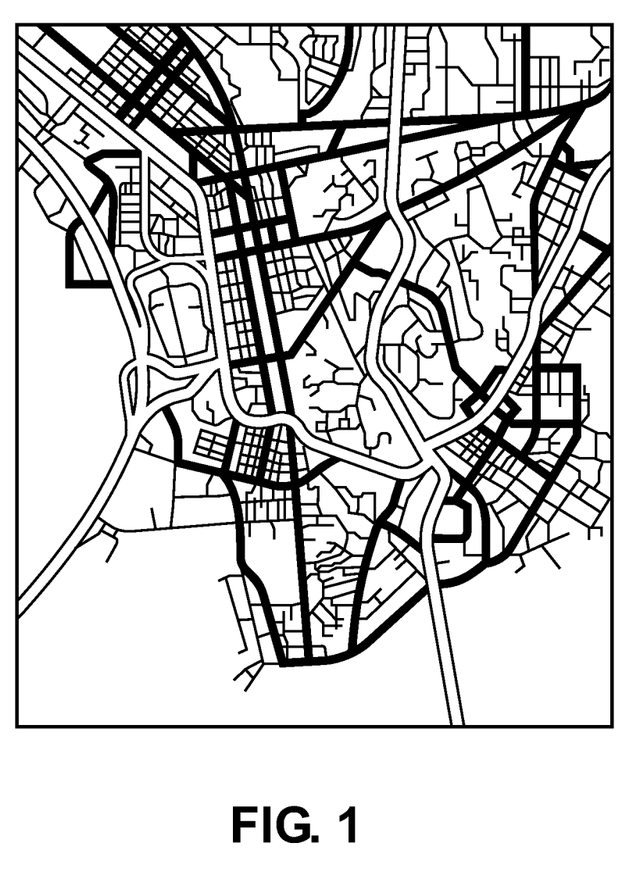
FIG. 1 is an exemplary depiction of a digital map comprising a roadway network as representative of one form of digital vector map of the type used in the subject invention.
Figure 2:
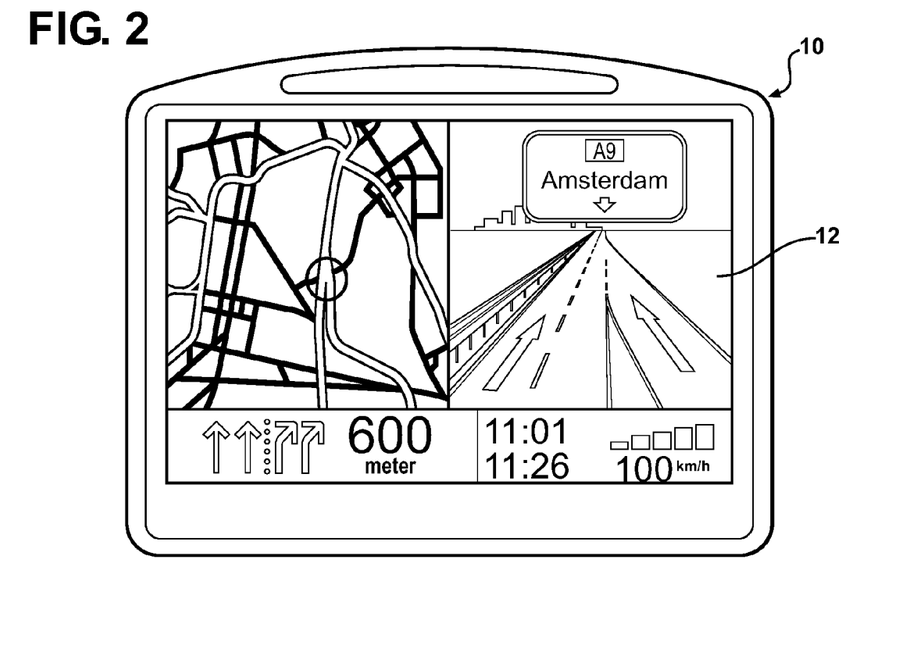
FIG. 2 is an exemplary view of a portable navigation system including a display screen for presenting map data information.

FIG. 1 depicts an exemplary digital map, or section thereof, such as may be of the type utilized by the methods of this invention. A digital map of this type is shown including primary roadways which may comprise divided motorways or dual carriageways, together with a hierarchy of secondary and tertiary roads representing smaller and lower classed driving lanes. FIG. 2 shows an exemplary GPS-enabled navigation device 10 including a display screen 12 or graphic user interface that portrays a network of streets for the purpose of rendering navigation assistance. The streets, of course, are provided by the digital map and correspond to a region of land in reality. The streets and roads depicted therein are contained in the digital map database as network elements which, of course, correspond to roads and lanes in real life.

Figure 4A:
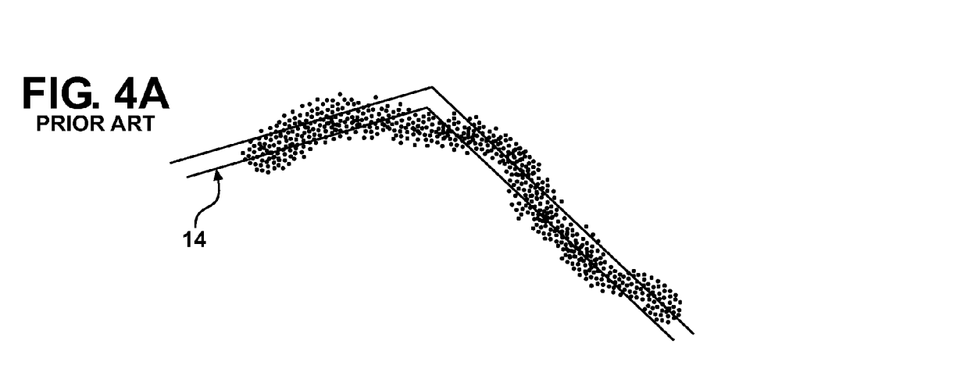
FIGS. 4A-C represent a progression of network modeling in which source data in the form of probe traces are used to derive an open-type active contour which is then optimized relative to the network element using conventional techniques.
Figure 4B:
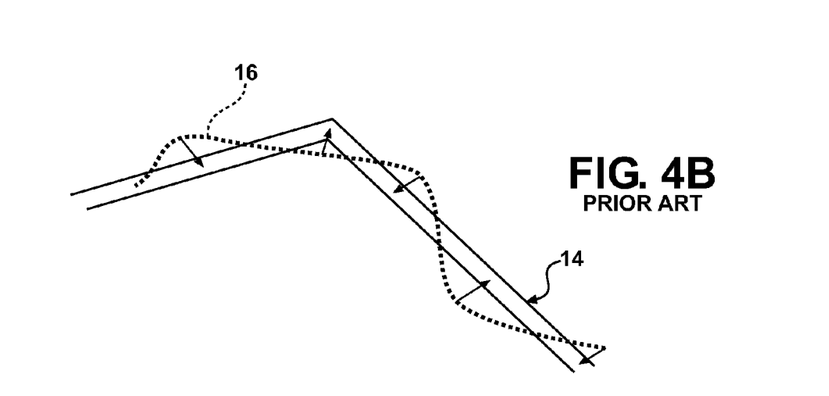
Figure 4C:
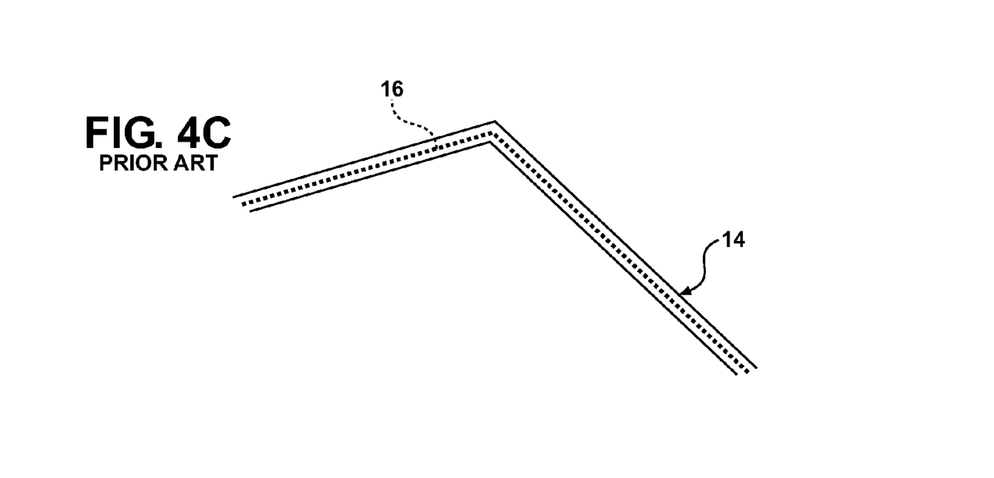

It is often desirable or necessary to assess the accuracy of a digital map based on some new data set. The new data set may comprise the probe trace data mentioned earlier, a secondary digital map, a spatially unreliable digital map, or other type of reference information. Sometimes, it is desirable to assess the accuracy of probe data based on a new data set which actually comes from an existing digital map. FIGS. 4A-C demonstrate one way in which a new data set in the form of collected probe traces may be used as source geometry to provide an initial or seed contour for the purpose of realigning network elements in a digital map using an active contours approach. In these views, a network element 14 is shown representing a roadway having a sharp, 90 degree turn in real life along the length thereof. Probe traces collected over time and grouped according to the particular network element 14 are shown superimposed. Using well known mathematical techniques, the probe traces can be derived into a source geometry which forms an active contour 16 as shown in FIG. 4B, representing the initial or seed contour as may be used in an active contour manipulation exercise.

As mentioned above, as well known in the field, an active contour 16 gets assigned both internal and external energies. The internal energy of an active contour 16 is only determined by the shape of the active contour(s) itself and is completely independent from any external source (in the example given earlier the network segment 14). The so-called external energy assigned to the active contour 16 is determined by the external source. That external source itself is not assigned any energy: it merely serves as the source to create the velocity field. The external energy of the active contour 16 is then determined by how this active contour 16 is located in the velocity field, defined by the external source (in most implementations this is the sum of all the velocity field values at the locations of the active contour control points). Consequently, in this example the network element 14 determines the velocity field which in turn determines the external energy of the active contour 16.

An active contour manipulation strategy seeks to reposition the active contour 16 relative to the network element 14 by iteratively adjusting it to more desired positions by trying to lower the internal energy of the active contour 16 and to lower its external energy (which is—via the velocity field—determined by network element 14). These techniques, which have been perfected over time and are extraordinarily effective, can result in the fitting of the open-type active contour 16 to the network element 14 as shown in FIG. 4C. Thus, through application of well known active contour processes, the initial active contour 16 can be nicely fit to the network element 14. From there, further analysis and editing steps may be pursued, including the potential realignment of the network element 14 or the addition of new network elements, to name but a few. In the preceding example, a probe line (derived from probe data some way or another) is the source geometry used to create the initial contour, which is repositioned in a velocity field determined by a network element 16. It could also be the other way around: a network element 16 could be the source geometry used as an initial contour that is repositioned in a velocity field determined by probe data (some another external energy source). Naturally, both techniques represent equally valid and possible implementations of this concept.

Figure 5A:
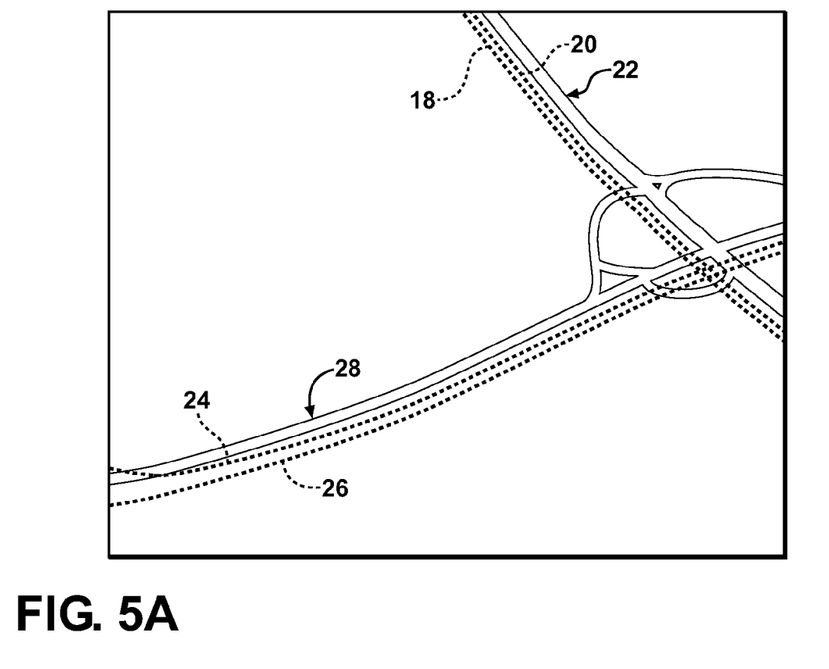
FIGS. 5A-B represent prior art results when two closely spaced open-type active contours, such as maybe derived from probe data for example, are individually optimized and result in poor alignment and overlapping in some sections.

A particular issue arises when the new data set produces one or more active contours which are spaced relatively close to one another and form a particular shape. This issue may for example arise when two nearby open active contours form respective portions of some fixed-shape object in reality, or when one closed active contour forms a particular geometry by itself. For example, as shown in FIG. 5A, first 18 and second 20 active contours may correspond to a network element 22 which comprises a generally north-south running motorway of the divided or dual-carriageway type. The first 18 and second 20 active contours represent traffic flowing in respective lanes, which active contours 18, 20 may have been derived from probe data. Likewise, third 24 and fourth 26 active contours correspond with a generally east-west running network element 28. The active contours 18, 20, 24, 26 are presented in somewhat raw or unprocessed format, that is prior to being optimized relative to the digital map. As can be seen quite clearly in FIG. 5A, a particularly prominent parallel relationship is established between the first and second 18, 20 and also between the third and fourth 24, 26 active contours. The parallel relationships in this example represent the respective portions of a fixed-shape object in reality, i.e., dual-carriageway highways.

Figure 5B:
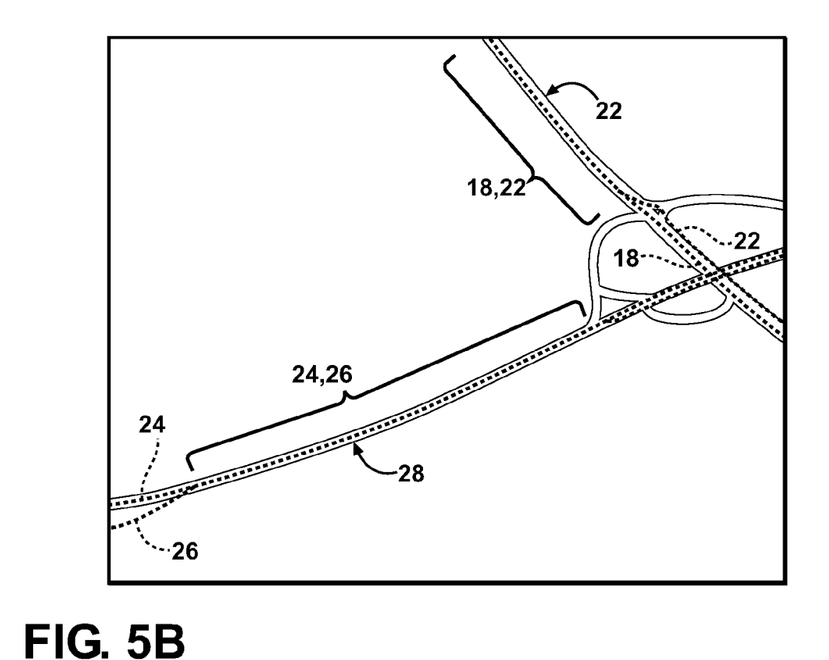

Using conventional optimization techniques, each active contour 18, 20, 24, 26 is individually and separately optimized which, in this particular field, frequently results in bad alignments. For example, FIG. 5B shows the unintended and undesirable merging or collapsing of the first 18 and second 20 active contours over a portion of the network element 22 as a result of traditional optimization steps. Likewise, the third 24 and fourth 26 active contours have collapsed or merged together over a section of the east-west network element 28. Such results are generally undesirable and result in a loss of detail, increase in editorial efforts and quite often the necessity to intervene manually in the active contour process so as to assist in maintaining certain relative shapes between closely-spaced active contours. Similar misalignment scenarios can present in other situations as well. For example, one or more active contours occurring in the area of a roundabout, i.e., a driving circle, may also fall prey to poor alignment during the optimization process and require manual intervention to remediate the unintended consequences.

These shortcomings in the optimization process of active contours occur equally whether the new data set, which is treated as the source geometry to which an active contour is fitted, is probe data or an existing digital map. Accordingly, there is a need in the art for an improved method for realigning network elements in a digital map using active contour manipulation techniques so that certain desirable contours and/or shapes can be maintained during the optimization process.

SUMMARY OF THE INVENTION

The invention overcomes the shortcomings and disadvantages of the prior art by providing a method for realigning features in a digital map using active contour manipulation techniques. A digital map is provided corresponding to a region of land in reality. The digital map has at least one network element corresponding to a feature in reality. A new data set is also provided which corresponds to the same feature in reality as that of the network element. Either the network or the new data set is treated as a source geometry having at least first and second active contours spaced apart one from the other and forming a relative shape therebetween. In other words, the first and second active contours may correspond to the network element, or alternatively to the new data set depending on the particular application. Meanwhile, the other of the network and the new data set is treated as an external energy source. Internal and external energy values are assigned to each of the first and second active contours, and a velocity field is assigned to the external energy source The improvement comprises coupling the first active contour to the second active contour while simultaneously optimizing the positions of the first and second active contours relative to the external energy source using an active contour manipulation strategy wherein the positions of the first and second active contours relative to the external energy source are together iteratively adjusted to more desired positions by trying to lower their respective internal energies in relation to the external energy source without changing the relative shape between the first and second active contours during the optimizing process.

Accordingly, each of the first and second (and if applicable the third and fourth, etc.) active contours have both an internal energy and an external energy assigned. The positions of the active contours are optimized in the external velocity field. This velocity field can be defined by the network elements so that the active contours (coming from probe data or some other type of data set) are optimized according to the positions of the network elements. Alternatively, it could also be the other way around: the active contours could be the network segments (i.e. their initial position could be the same as the network element's position) moving in an external velocity field defined by the probe data.

The invention enables the modeling of a specific part of network geometry by grouping two active contours into a coupled active contour, in which certain fixed properties of the specific part of the network geometry being modeled are maintained during optimization. This is in sharp contrast to prior art techniques wherein active contours are each individually optimized and result in undesirable alignment conditions.

In one embodiment of the invention, a dual carriageway or divided highway is modeled, having two parallel roads. The distance between both lanes, each lane being represented by a traditional open active contour, is kept fixed by making both lanes aware of each other and handling them both together as one active contour whose position is optimized. In this manner, the fixed distance between both parallel lanes is maintained during all phases of optimization, corresponding to the real world situation. In another embodiment, the methods of this invention model a roundabout or turning circle with adjacent roads by a coupled active contour in which the circularity of the central part is maintained during optimization. Of course, many other applications will become apparent to those of skill in the art, and it is conceivable that more or less than two active contours can be manipulated in this fashion so as to maintain the shape of certain objects in reality during the optimization process.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 3:
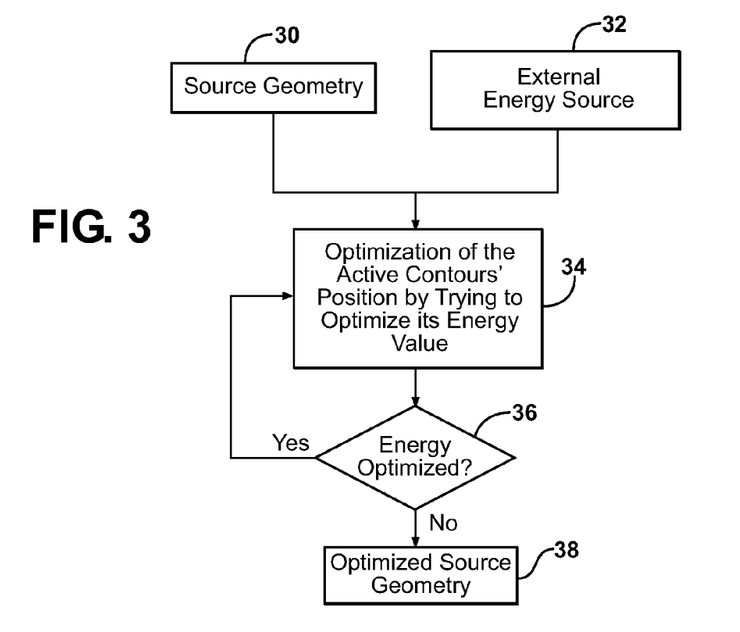
FIG. 3 is an exemplary flow chart describing the optimization of a source geometry using active contours.

Referring to the Figures, wherein like numerals indicate like or corresponding parts throughout the several views, a method of optimizing a source geometry by using active contours is shown schematically in FIG. 3. Source geometry function block 30 represents a new data set. This new data set may, for example, originate from a digital map of the type corresponding to a region of land in reality. Alternatively, the new data set which comprises the source geometry may be derived from probe data, or from some other source. It should be again noted that, although many references herein ascribe the probe data as the source geometry and the network features as the external energy source, this is merely one expression of these general concepts. Indeed, the source geometry is the geometry that is turned into active contours and that is iteratively optimized directly to a new geometry. Therefore, in situations where the probe data is considered more reliable than the network elements in an existing digital map, the network features will be treated as the source geometry and the probe data treated as the external energy source. External energy source function block 32 represents the more reliable data set which may originate from a digital map, be derived from probe data, or come from some other type of reference source. Digital maps contain at least one, and typically many thousands or millions of network elements which correspond to features in reality such as a highway, road path or other such feature.

Source geometry provides the one or more active contour which are each assigned an internal energy value and an external energy value according to techniques well known to those in the field of active contour modeling. The internal energy is derived from the source geometry only, and the external energy is derived from the external energy source. The active contours of interest in this invention are spaced apart from one another and form a relative shape there between. The active contours correspond to a particular network element, and may for example model the behavior of divided lanes of highway or the movement of vehicles through a turning circle.

Using known techniques, optimization of the active contours is carried out in function block 34. In this step, the active contours' positions are optimized according to their energy values in relation to the assigned velocity field of an external energy source. Decision block 36 represents the iterative nature of an active contour manipulation process which, when carried to its natural conclusion, results in optimization of the source geometry 38. If probe traces are treated as the external energy source, the active contours originate from the network elements, and vise-versa.

One method for assigning an external energy to the active contours in such situations, which is always derived from the external velocity field from the external energy source, may involve the use of raster images with gradient values. In such cases, the gradient values between pixels in the raster image can be regarded as the external forces. Such raster images could be made from a digital map or from probe data. For example, the network elements may be presented in raster image formats that correspond to derived vehicle position probability densities.

Figure 6:
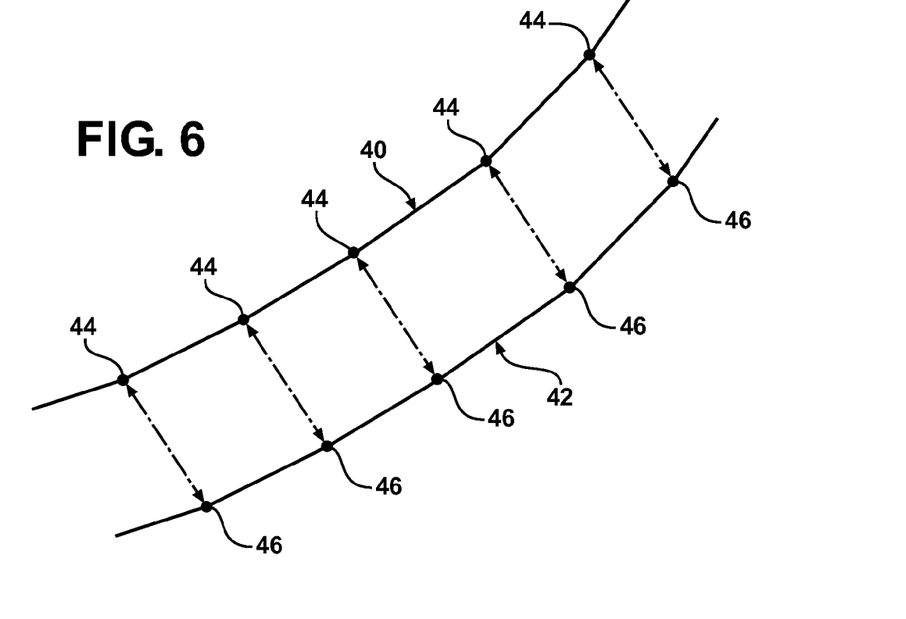
FIG. 6 is a simplified view of two closely spaced active contours such as may be derived from probe data for example, and which each include a plurality of control points spaced there along, together with the coupling of those control points to one another using the methods of this invention.

Turning now to FIG. 6, first 40 and second 42 active contours are shown including a plurality of respective control points 44, 46 spaced incrementally there along. The control points, or shape points, represent nodes with the intervening segments there between forming edges or links consistent with well known techniques. According to the methods of this invention, the first active contour 40 is coupled to the second active contour 42 during the optimization process. Thus, optimizing according to this invention occurs simultaneously with the contours 40, 42 being coupled or fixed together as, in essence, a unitary active contour. The coupling of the active contours 40, 42 is represented by broken arrows extending between opposing control points 44, 46 in FIG. 6. Thus, using an active contour manipulation strategy wherein the positions of the first 40 and second 42 active contours are optimized relative to a network element, these coupled contours 40, 42 are moved together in an iterative adjustment fashion to achieve a more desired position or positions relative to the external energy source. As stated previously, an active control manipulation strategy includes the steps of trying to lower the respective internal energies of the active contours 40, 42 relative to the velocity field of the external energy source. By coupling the first 40 and second 42 active contours together, the relative shape between these contours can be maintained during the optimization process. In other words, taking the example in FIG. 6, the shape between the active contours 40, 42 is defined by their generally parallel nature and will be preserved because each contour 40, 42 is not being separately and independently optimized. Once the active contours 40, 42 are coupled or tied together, they will undergo the optimization process in concert or in harmony with one another, but moving in the same direction and same distance so that the particular relative shape between the active contours 40, 42 does not change during the optimizing process.

Most preferably, the coupling step includes a more or less direct linking of one control point 44 in the first active contour 40 to a corresponding control point 46 in the second active contour. It may be desirable to couple control points that are close to one another in their respective active contours, however this is not necessary. Thus, by maintaining a fixed spacing between the linked control points, 44, 46, these active contours, 40, 42 can be manipulated relative to the external energy source without changing the particular shape of concern formed by the two active contours 40, 42.

Figure 7:
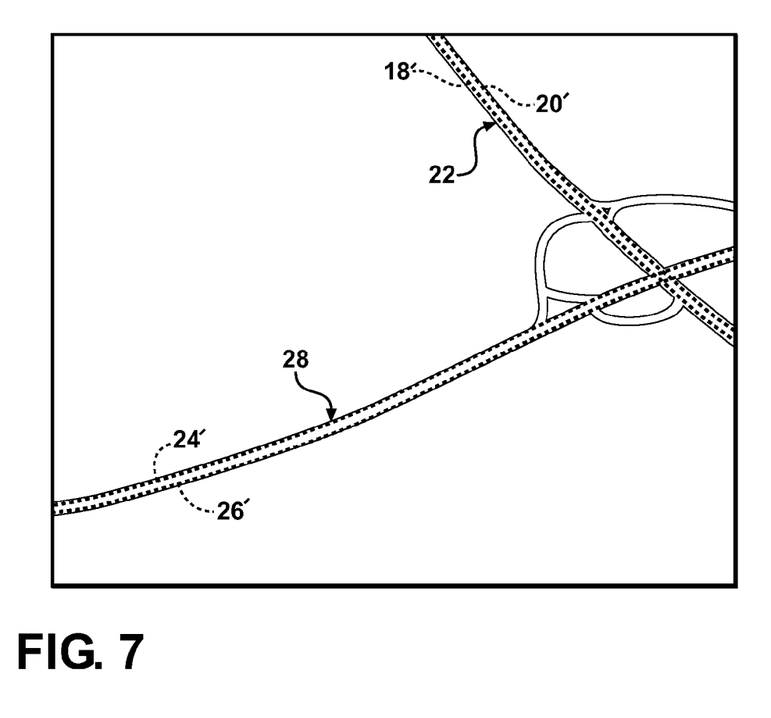
FIG. 7 is a view as in FIGS. 5A-B, but illustrating the manner in which the optimal, relative shapes between the active contours can be maintained during the optimization process so as to produce better results.

Thus, as shown in FIG. 7, if the active contours 18', 20' and 24', 26' are optimized using the novel coupling process of this invention, the parallel lanes represented by the respective active contours 18', 20', 24', 26' are not collapsed and have maintained the fixed distance between the lanes during optimization which more closely corresponds with the real world situation. As a result, the respective contours are nicely aligned to their respective external energy sources, which in this example comprise network elements 22, 28.

Thus, in situations where a dual carriageway can be modeled by two separate, parallel active contours, principles of this invention are particularly advantageous. Using prior art techniques, each lane optimizes its position independently. The undesirable results are shown, for example in FIG. 5B where one lane is also attracted by forces which are meant for the other lane. When the misalignment of the dual carriageway is larger than the fixed distance between both lanes, it is likely that one lane will reposition itself in a position that is meant for the other lane. Moving this badly located lane out of this position is unlikely using traditional active contour methodology, since its external energy will (temporarily) increase in order to move across the high energy area between both lanes. This, therefore, results in a collapsing of lanes, or stretches along the dual carriageway when the fixed distance between both lanes is not maintained. As a result of prior art techniques, the optimized representation does not correspond to the real physical world.

However, using principles of this invention as described previously, the two parallel active contours are coupled. Together, they are optimized as if one unitary active contour. In other words, the position of the lanes is not optimized separately, but rather together. Every control point 44 or shape point of one contour 40 is linked with a corresponding control point 46 and the other active contour 42. When one point 44 is moved during optimization, its corresponding point 46 moves with it in the same way. This means that the distance between both contours 40, 42 is guaranteed to be kept fixed at all times during the optimization. Therefore, and certainly in the embodiment of a dual carriageway, modeling the dual carriageway by an extended active contour which consists of two parallel open active contours with a fixed distance between them is kept during optimization of the extended active contour position. In more general terms, however, the invention pertains to modeling a specific part of the source network geometry by an extended active contour comprising a number of coupled active contours, in which certain distances between control points 44, 46 are kept fixed during the optimization. Thus, the relative shape of these parts will not change.

Figure 8:
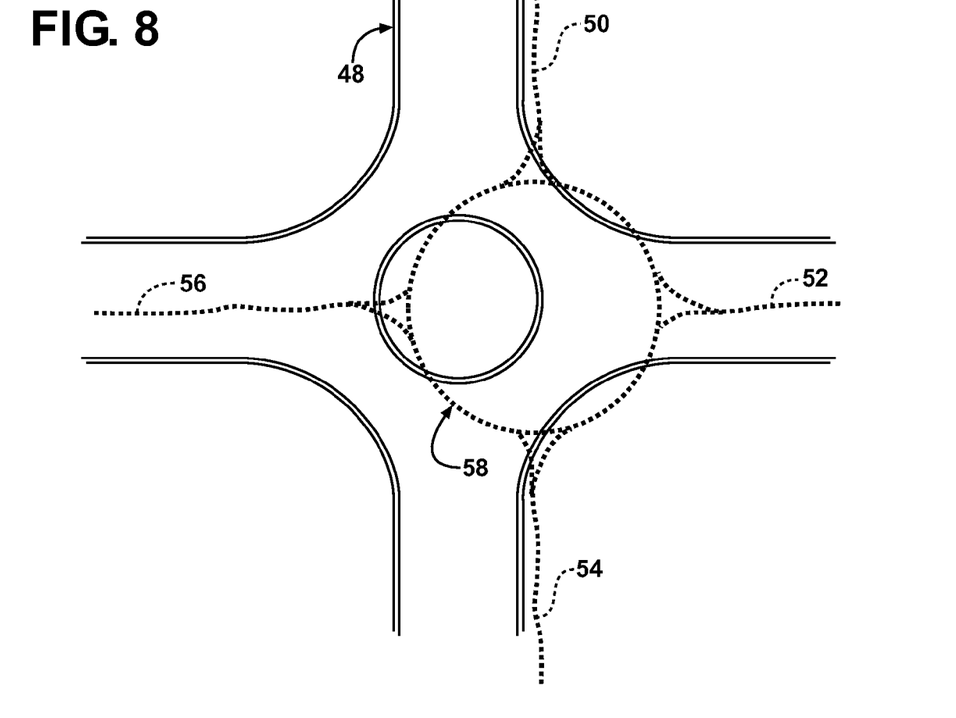
FIG. 8 illustrates the formation of initial active contours in relation to a digital map having a roundabout network element and prior to the optimization process.

In another example of these techniques, the shape of the central part of a roundabout, for example, can be maintained in the same manner as the fixed distance between multiple parallel roads in the preceding examples. Turning more specifically to FIG. 8, a network element representing a roundabout in real life is generally indicated at 48. A plurality of active contours 50, 52, 54, and 56 are introduced from a new data set which, for example, may be derived from probe data or a network of another geometry. A closed-type active contour 58 corresponds to the roundabout portion of the network element 48. These active contours 50-58 are shown in raw or pre-optimized condition in FIG. 8.

Figure 9A:
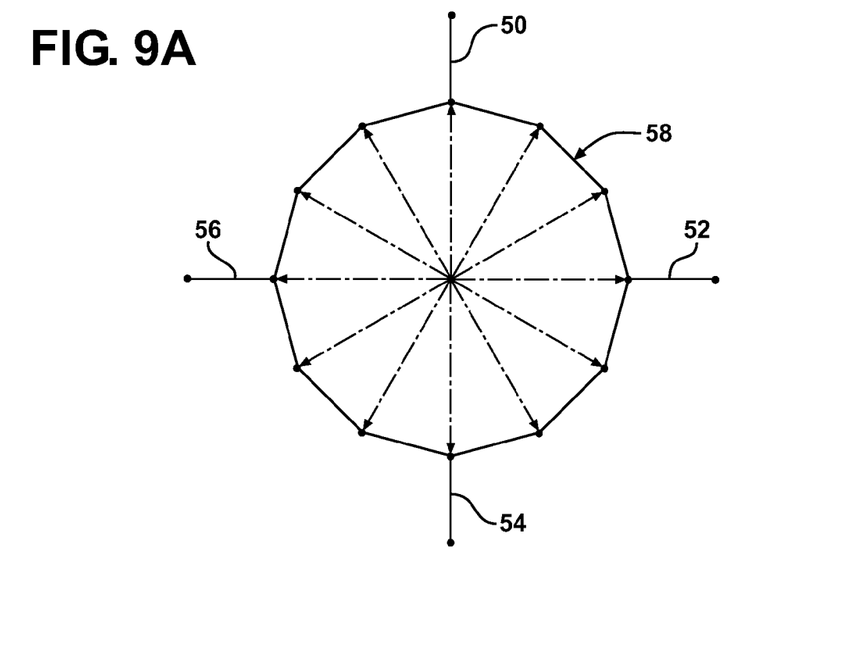
FIGS. 9A and 9B describe the active contours associated with the embodiment of FIG. 8, together with the coupling of control points, whereby FIG. 9A describes a diametric coupling of control points and FIG. 9B describes an alternative lateral coupling of control points.
Figure 9B:
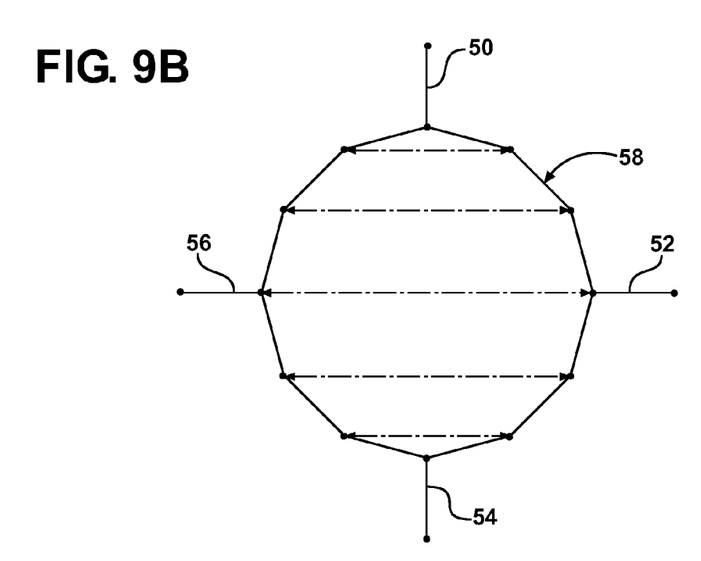
Figure 10:
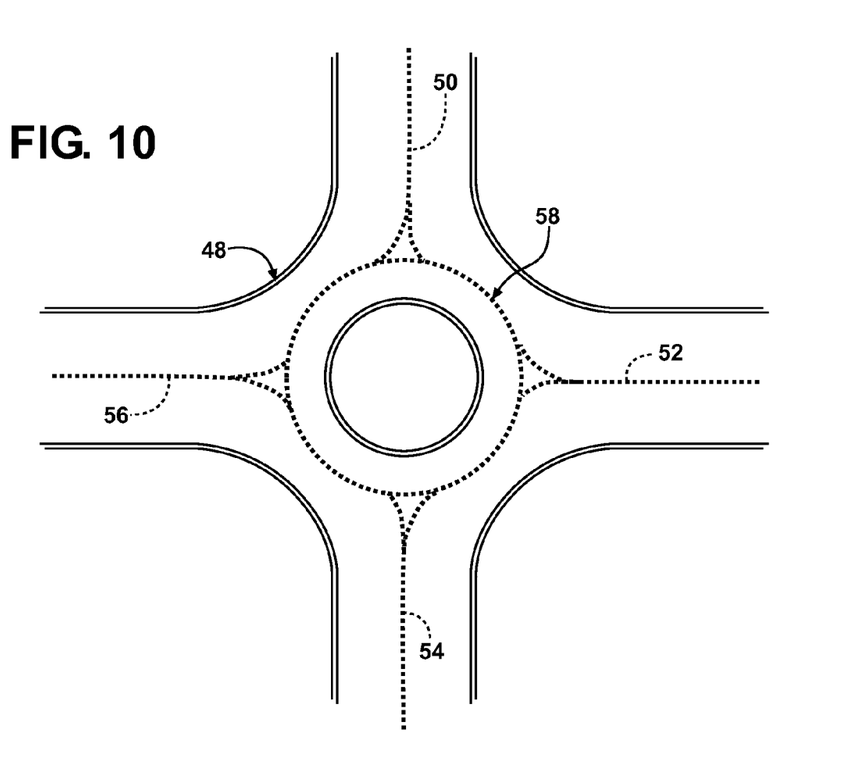
FIG. 10 is a view as in FIG. 8 showing the manner in which the active contour forming the turning circle is maintained with its circular shape during the optimization process to produce an acceptable finished product.

FIG. 9 shows the active contours 50-58 together with their embedded control points. In order to maintain the relative shape of the roundabout portion of active contour 58, its control points are coupled or linked with a diagonally opposed control point as represented by the broken arrows in FIG. 9A. This coupling is in place prior to start of the optimization process so that, after optimization of the active contour's position using the energy value process described previously, the original circular shape will be maintained. Alternatively, FIG. 9B describes different coupling strategy whereby control points are linked laterally about the active contour 58 to achieve the same or similar results. Of course, other coupling or linking strategies may be employed with varying degrees of effectiveness. Those of skill in the field will also readily appreciate that this invention is applicable to network geometries other than dual carriageways and roundabouts, but can be used to maintain the relative shape between any one or more active contours using this novel coupling approach. FIG. 10 is a view as in FIG. 8 but showing the active contours 50-58 post-optimizing in which coupling of the roundabout active contour 58 has produced the desired end results.

In the case of roundabouts and other features which may be associated with a closed active contour, like that shown in FIGS. 9A and 9B, the coupling process may occur within the particular control points of a single closed active contour. Thus, it may not in all instances be necessary to couple two distinct active contours without departing from the spirit of this invention. Similarly, more than two active contours can be coupled during optimization in appropriate circumstances.

Thus, according to the principles of this invention, modeling a specific part of a network geometry is accomplished not by a set of active contours which are individually optimized, but by grouping the active contours into a coupled active contour, in which certain fixed properties of the specific part of the network geometry being modeled are maintained during optimization. According to known active contour strategies, a stretch of road network serving as a source geometry can be modeled by an active contour which is a line segment that optimizes its position by iteratively trying to lower its energy. Energy may be described as comprising two main parts: the internal energy trying to keep the contour's original shape and the external energy which attempts to move the original shape. Thus, the internal energy which is derived from source geometry discourages shape deformation which may take the form of very shape bends, stretching, contracting and the like. The external energy derived from external source data, on the other hand, encourages movement of the active contour to a more desired position. These techniques are well described in the literature pertaining to active contours, and can be applied directly in the context of this invention with the addition of these novel coupling techniques.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A method for improving a digital map using active contour manipulation techniques, said method comprising the steps of:
providing a digital map corresponding to a region of land in reality, the digital map having at least one network element corresponding to a feature in reality;
providing a new data set corresponding to the same feature in reality as the network element;
treating one of the network and the new data set as a source geometry having at least first and second active contours spaced apart one from the other and forming a relative shape therebetween, while treating the other of the network and the new data set as an external energy source;
assigning internal and external energy values to each of the first and second active contours, and assigning a velocity field to the external energy source; and
coupling the first active contour to the second active contour while simultaneously optimizing the positions of the first and second active contours relative to the external energy source using an active contour manipulation strategy wherein the positions of the first and second active contours relative to the external energy source are together iteratively adjusted to more desired positions by trying to lower their respective internal energies in relation to the external energy source without changing the relative shape between the first and second active contours during the said optimizing process.

2. The method of claim 1 wherein each of the first and second active contours include a plurality of control points spaced therealong, said coupling step including linking a control point in the first active contour with a corresponding control point in the second active contour and further including proportionally moving the linked control points in direction and distance during the respective said optimizing steps.

3. The method of claim 2 wherein said step of proportionally moving the linked control points includes maintaining a constant distance between the linked control points throughout said step of simultaneously optimizing the positions of the first and second active contours.

4. The method according to claim 1 wherein said step of providing a new data set includes collecting probe data from a plurality of probes, each probe developing a respective probe trace comprising a sequence of discrete time-stamped probe positions plotted relative to the digital map.

5. The method according to claim 1 wherein said step of providing a new data set includes providing a secondary digital map network.

6. The method according to claim 1 wherein said step of providing a new data set includes providing generally parallel first and second active contours corresponding to a dual carriageway road feature.

7. The method according to claim 1 wherein said step of providing a new data set includes providing generally arcuate first and second active contours corresponding to a roundabout road feature.

8. The method according to claim 1 wherein said step of assigning internal and external energy values includes assigning equal energy values to the first and second active contours.

9. The method according to claim 1 wherein said step of assigning a velocity field includes drawing probe traces on raster images and then using the resulting gradient values between pixels as the assigned velocity field.

10. The method according to claim 1 wherein said step of assigning a velocity field includes creating raster images from another network geometry and then using the resulting gradient values between pixels as the assigned velocity field.

11. A method for re-aligning network elements in a digital map using active contour manipulation techniques, said method comprising the steps of:
providing a digital map corresponding to a region of land in reality, the digital map having at least one network element corresponding to a feature in reality;
providing a new data set corresponding to the same feature in reality as the network element;
treating one of the network and the new data set as a source geometry having at least one closed active contour forming an original relative shape, the closed active contour including a plurality of control points spaced thereabout;
treating the other of the network and the new data set as an external energy source;
assigning internal and external energy values to the closed active contour, and assigning a velocity field to the external energy source; and
coupling each control point in the closed active contour to another control point in the closed active contour while simultaneously optimizing the position of the closed active contour relative to the external energy source using an active contour manipulation strategy wherein the position of the closed active contour relative to the external energy source is iteratively adjusted to a more desired position without changing the original relative shape within the closed active contour during the said optimizing process.

12. The method of claim 11 wherein said coupling step includes linking at least two control points and moving the linked control points in unison during said optimizing step.

13. The method of claim 11 wherein said step of providing a new data set includes collecting probe data from a plurality of probes, each probe developing a respective probe trace comprising a sequence of discrete time-stamped probe positions plotted relative to the digital map.

14. The method of claim 11 wherein said step of providing a new data set includes providing a secondary digital map network.

* * * * *